(12) United States Patent
Hisada

(10) Patent No.: US 6,722,456 B2
(45) Date of Patent: Apr. 20, 2004

(54) HYBRID VEHICLE

(75) Inventor: Hideki Hisada, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 194 days.

(21) Appl. No.: 09/892,440

(22) Filed: Jun. 28, 2001

(65) Prior Publication Data

US 2002/0017406 A1 Feb. 14, 2002

(30) Foreign Application Priority Data

Jun. 28, 2000 (JP) .......................... 2000-194628

(51) Int. Cl.$^7$ .................................. B60K 1/00
(52) U.S. Cl. ................. 180/65.2; 192/30 W; 477/906; 475/2
(58) Field of Search ............... 180/65.2, 65.3, 180/65.4, 65.6, 65.8; 192/30 W; 477/906; 475/2, 5, 8; 701/22; 322/14, 15, 16

(56) References Cited

U.S. PATENT DOCUMENTS

| | | | |
|---|---|---|---|
| 3,702,458 A | * 11/1972 | Capachietti, Sr., et al. ... | 192/30 W |
| 5,433,282 A | 7/1995 | Moroto et al. | |
| 5,642,793 A | * 7/1997 | Ljosne | 192/30 W |
| 5,788,006 A | 8/1998 | Yamaguchi | |
| 5,799,744 A | * 9/1998 | Yamaguchi et al. | 180/65.2 |
| 5,823,282 A | * 10/1998 | Yamaguchi | 180/65.2 |
| 5,931,271 A | * 8/1999 | Haka | 180/65.2 X |
| 6,167,996 B1 | * 1/2001 | Huber et al. | 192/30 W |
| 6,234,930 B1 | * 5/2001 | Kaneko et al. | 475/5 |
| 2001/0027907 A1 | * 10/2001 | Nishida et al. | |
| 2002/0019294 A1 | * 2/2002 | Yamazaki et al. | |
| 2002/0038747 A1 | * 4/2002 | Huschka et al. | |

FOREIGN PATENT DOCUMENTS

| | | |
|---|---|---|
| DE | 199 23 970 A1 | 12/1999 |
| EP | 1177931 | * 6/2002 |
| JP | 5319110 | * 12/1993 |
| JP | 8-295140 | 11/1996 |

* cited by examiner

Primary Examiner—Bryan Fischmann
(74) Attorney, Agent, or Firm—Oliff & Berridge, PLC (57) ABSTRACT

To realize a determination whether or not a failure has occurred in a one-way clutch, a hybrid vehicle is provided with an engine 11, a generator motor 16, an output shaft coupled to a driving wheel 41, a differential gear unit that is provided with at least three gear elements, the elements coupled to the engine 11, the generator motor 16, and the output shaft, respectively, a one-way clutch that is placed in a free state when the engine 11 rotates in a forward direction and in a locked state when the engine 11 begins to rotate in a backward direction, and a failure occurrence determination process means 91 that determines that a failure has occurred in the one-way clutch if an engine speed is a negative value. Since it is determined that a failure has occurred in the one-way clutch when the engine speed is a negative value, a damage of the one-way clutch can be prevented from being aggravated.

10 Claims, 9 Drawing Sheets

HYBRID VEHICLE

BACKGROUND OF THE INVENTION

1. Field of the Invention

The present invention relates to a hybrid vehicle.

2. Description of Related Art

Conventionally, a hybrid vehicle is, for example, provided with an engine, a drive motor, a generator motor, and a planetary gear unit as a differential gear unit, wherein the three gear elements of the planetary gear unit are coupled to the engine, the generator motor, and an output shaft, respectively, and, furthermore, the drive motor is coupled to the output shaft, thereby transmitting part of a power output from the engine to the generator motor and a remainder of the power output from the engine to the output shaft.

When the hybrid vehicle is to be run with the engine stopped, the drive motor is driven mainly and, for a portion of a driving force generated by the drive motor that falls short of a total driving force required for running the hybrid vehicle, the generator motor is driven and a motor torque generated by the generator motor is transmitted through the planetary gear unit to the output shaft, thus supplementing a total power requirement. (See Japanese Patent Application Laid-Open No. HEI 8-295140.)

To prevent the engine from being rotated in a backward direction as the vehicle is driven by the drive motor and the generator motor, a one-way clutch is disposed between the output shaft to which engine rotation is transmitted and a casing.

In the conventional hybrid vehicle, however, a driving force is always supplemented by the generator motor each time the hybrid vehicle is started and the one-way clutch receives a reaction force generated by the driving of the generator motor. The one-way clutch is therefore subjected to a repeated load, resulting in a damage thereof, thus giving rise to such problems as backward rotation and seizure. There is, however, no means of determining whether or not a failure has occurred in the one-way clutch. This aggravates the damage of the one-way clutch.

If, for example, the one-way clutch rotates in the backward direction, it causes the engine to rotate in the backward direction. The terminology "engine rotate in a backward direction" is also referred to herein as the "engine speed is a negative value." Backward rotation of the engine could affect engine functions. If, on the other hand, the one-way clutch seizes, not only the engine motoring, which is a condition wherein the engine speed is increased to a level that permits ignition of the engine, is disabled by controlling the drive motor and the generator motor, but also a current supply from the battery to the generator motor is continued. Consequently, there is a possibility of a battery rundown.

Furthermore, the battery cannot be charged by the generator motor, since the engine cannot be started properly.

SUMMARY OF THE INVENTION

It is an object of the present invention to solve these problems of the conventional hybrid vehicle and to provide a hybrid vehicle that can determine whether or not a failure has occurred in the one-way clutch.

To achieve the aforementioned object, a hybrid vehicle of the present invention is provided with an engine, a generator motor, an output shaft coupled to a driving wheel, a differential gear unit that is provided with at least three gear elements, the elements coupled to the engine, the generator motor, and the output shaft, respectively, a one-way clutch that is placed in a free state when the engine rotates in a forward direction and to a locked state when the engine begins to rotate in a backward direction, and a failure occurrence determination process means that determines that a failure has occurred in the one-way clutch if an engine speed is a negative value.

In this case, it is determined that a failure has occurred in the one-way clutch if the engine speed is a negative value. The damage of the one-way clutch can therefore be prevented from being aggravated by controlling the engine so as to rotate in the forward direction.

Another hybrid vehicle of the present invention is provided with an engine, a generator motor, an output shaft coupled to a driving wheel, a differential gear unit that is provided with at least three gear elements, the elements coupled to the engine, the generator motor, and the output shaft, respectively, a one-way clutch that is placed in a free state when the engine rotates in a forward direction and in a locked state when the engine begins to rotate in a backward direction, and a failure occurrence determination process means that determines that a failure has occurred in the one-way clutch if the engine speed is a negative value, i.e., if the engine rotates backwards, when the motor torque in a direction of lowering the engine speed is generated by the generator motor.

In this case, it is determined that a failure has occurred in the one-way clutch if the engine speed is a negative value when the motor torque in the direction of lowering the engine speed is generated by the generator motor. The damage of the one-way clutch can therefore be prevented from being aggravated if the generator motor is stopped from generating the motor torque so as to lower the engine speed and the engine is controlled so as to be rotated in the forward direction.

Still another hybrid vehicle of the present invention is further provided with an error process means that, when it is determined that a failure has occurred in the one-way clutch, stops the generator motor from generating a motor torque in a direction of lowering the engine speed i.e., in a direction opposite to the forward engine direction of rotation.

Still another hybrid vehicle of the present invention is provided with an engine, a generator motor, an output shaft coupled to a driving wheel, a differential gear unit that is provided with at least three gear elements, the elements coupled to the engine, the generator motor, and the output shaft, respectively, a one-way clutch that is placed in a free state when the engine rotates in a forward direction and in a locked state when the engine begins to rotate in a backward direction, and a failure occurrence determination process means that determines that a failure has occurred in the one-way clutch if a motor torque generated by the generator motor is greater than a motor torque threshold value and, at the same time, an engine speed is a value less than an engine speed threshold value, when a motor torque in a direction of increasing the engine speed is generated by the generator motor.

In this case, it is determined that a failure has occurred in the one-way clutch if the motor torque generated by the generator motor is greater than the motor torque threshold value and, at the same time, the engine speed is a value less than the engine speed threshold value, when the motor torque in the direction of increasing the engine speed is generated by the generator motor. It is therefore possible to prevent the battery from running down by stopping the engine to start or limiting the motor torque generated by the drive motor.

Still another hybrid vehicle of the present invention is further provided with an error process means that, when it is determined that a failure has occurred in the one-way clutch, stops the engine from being started.

Still another hybrid vehicle of the present invention is further provided with a drive motor that is driven by an electric power obtained from the generator motor and an error process means that, when it is determined that a failure has occurred in the one-way clutch, limits a motor torque generated by the drive motor.

In this case, the motor torque generated by the drive motor is limited. This allows the hybrid vehicle to move to a safe location or to a nearest service shop by driving the drive motor only.

In still another hybrid vehicle of the present invention, the failure occurrence determination process means determines that a failure has occurred in the one-way clutch if the engine speed continues to be the value less than the engine speed threshold value for a predetermined time.

In this case, it is determined that a failure has occurred in the one-way clutch when the engine speed continues to be the above mentioned value for a predetermined time. This can prevent a false determination due to a detection error or the like from being made.

DETAILED DESCRIPTION OF THE PREFERRED EMBODIMENTS

The present invention will hereinafter be described in detail as preferred forms of the embodiments with reference to the drawings.

Figure 2:
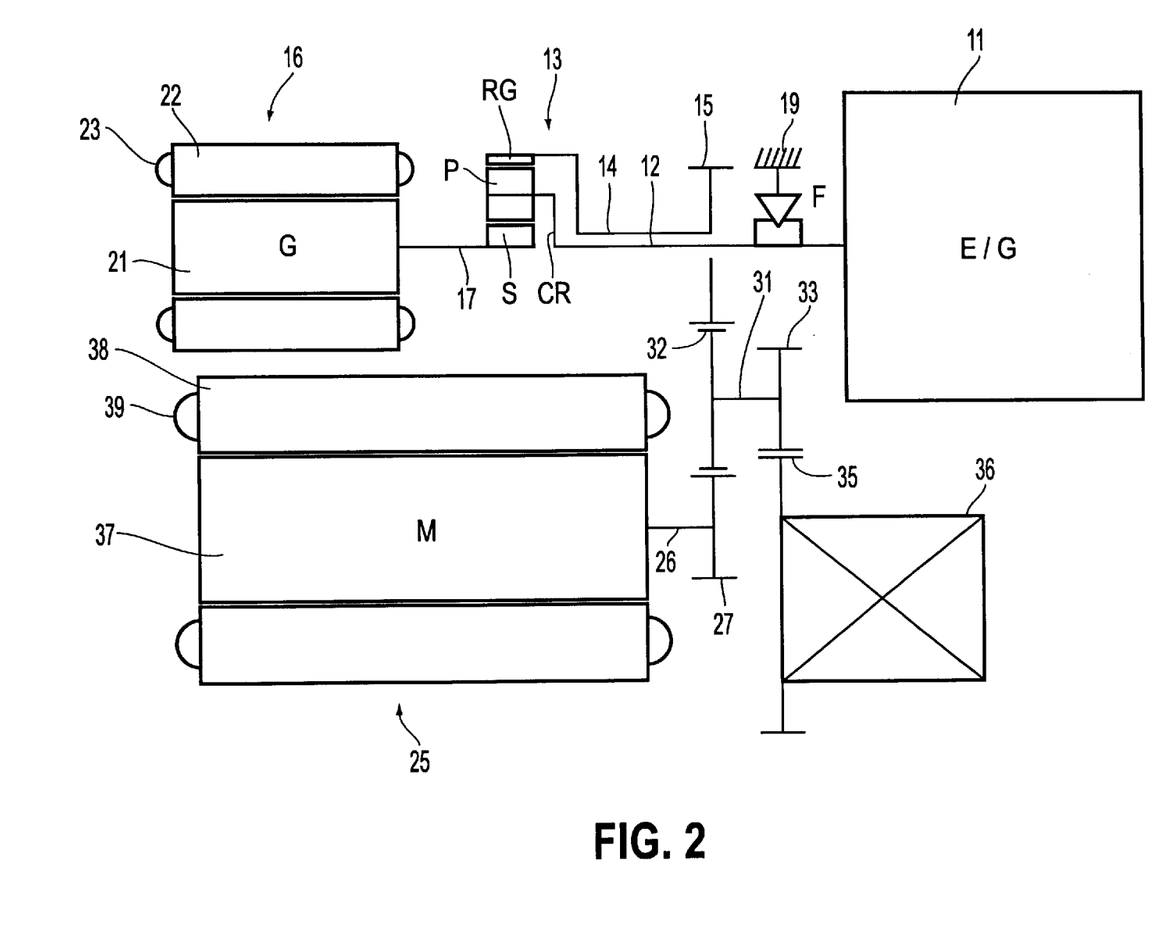
FIG. 2 is a conceptual drawing representing the driving unit for the hybrid vehicle according to the first embodiment of the present invention.

FIG. 2 is a conceptual drawing representing a driving unit for a hybrid vehicle according to a first embodiment of the present invention.

Referring the figure, a reference numeral 11 represents an engine (E/G). The engine 11 is connected to a radiator or another cooling unit (not shown) and cooled when a heat generated therein is discharged by the cooling unit. A reference numeral 12 represents an output shaft to which a rotation of the engine 11 is output, a reference numeral 13 represents a planetary gear unit as a differential gear unit that changes the speed of the rotation input through the output shaft 12, a reference numeral 14 represents an output shaft to which the rotation after the speed change at the planetary gear unit 13 is output, a reference numeral 15 represents a first counter drive gear secured to the output shaft 14, and a reference numeral 16 represents a generator motor (G) that is coupled to the planetary gear unit 13 through a transmission shaft 17.

A one-way clutch F is disposed between the output shaft 12 and a casing 19. The one-way clutch F is placed into the free state when the engine rotates in the forward direction and into the locked state when the output shaft 12 begins to rotate the engine 11 in the backward direction.

The output shaft 14 has a sleeve shape and is disposed so as to enclose the output shaft 12. The first counter drive gear 15 is disposed closer to the engine 11 than the planetary gear unit 13.

The planetary gear unit 13 comprises a sun gear S as a first gear element, a pinion P in mesh with the sun gear S, a ring gear RG as a second gear element in mesh with the pinion P, and a carrier CR as a third gear element that rotatably supports the pinion P.

The sun gear S is coupled via the transmission shaft 17 to the generator motor 16, the ring gear RG is coupled via the output shaft 14 to the first counter drive gear 15, and the carrier CR is coupled via the output shaft 12 to the engine 11. The output shaft 14 is coupled to a driving wheel (not shown) by way of the first counter drive gear 15, and a counter driven gear 32, a counter shaft 31, a differential ring gear 35, and a differential unit 36 to be described later.

The generator motor 16 is secured to the transmission shaft 17 and comprises a rotor 21 disposed rotatably, a stator 22 disposed around the rotor 21, and a coil 23 installed by winding around the stator 22. The generator motor 16 generates an electric power by using the rotation transmitted via the transmission shaft 17. The coil 23 is connected to a battery (not shown) and supplies current to, and thus charges, the battery. A brake (not shown) coupled to the casing 19 is disposed to the rotor 21. The rotor 21 can be stopped by engaging the brake.

A reference numeral 25 represents a drive motor (M), a reference numeral 26 represents an output shaft to which a rotation of the drive motor 25 is output, and a reference numeral 27 represents a second counter drive gear secured to the output shaft 26. The drive motor 25 is secured to the output shaft 26, and comprises a rotor 37 disposed rotatably, a stator 38 disposed around the rotor 37, and a coil 39 installed by winding around the stator 38.

The drive motor 25 generates a torque by using the current supplied to the coil 39. To accomplish this, the coil 39 is connected to the battery so as to receive the current supplied therefrom. When the hybrid vehicle is in a decelerating state, the drive motor 25 receives the rotation from the driving wheel to generate a regenerative current and supplies the regenerative current to the battery for charging.

A countershaft 31 is disposed to rotate the driving wheel in the same direction as the engine 11 and a counter driven gear 32 is secured to the countershaft 31. The counter driven gear 32 is meshed with the first counter drive gear 15 and the second counter drive gear 27 and a rotation of the first counter drive gear 15 and a rotation of the second counter drive gear 27 are reversed and transmitted to the counter driven gear 32.

Furthermore, a differential pinion gear 33 having a smaller number of gear teeth than the counter driven gear 32 is secured to the countershaft 31. A differential ring gear 35 is also disposed and meshed with the differential pinion gear 33. A differential unit 36 is secured to the differential ring gear 35. The rotation transmitted to the differential ring gear 35 is distributed by the differential unit 36 and transmitted to the driving wheel.

The operation of the driving unit having the aforementioned configuration will now be described.

Figure 3:
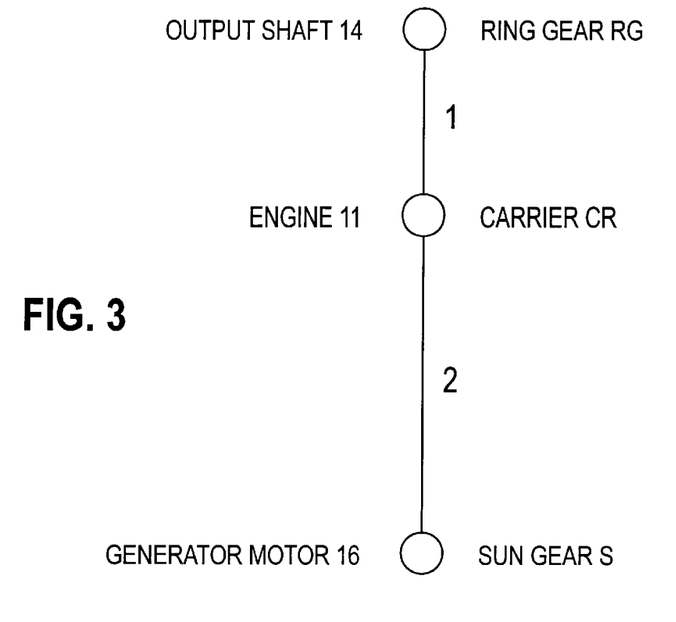
FIG. 3 is a conceptual drawing showing the planetary gear unit according to the first embodiment of the present invention.
Figure 4:
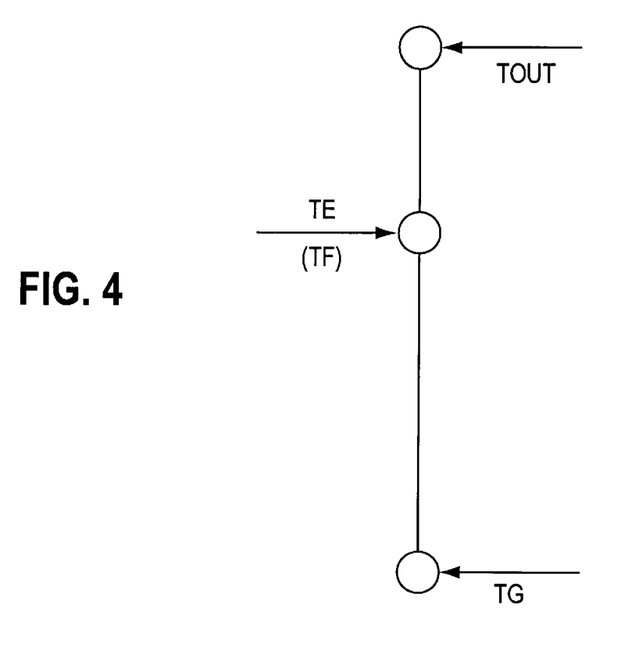
FIG. 4 is a torque diagram during an ordinary running state according to the first embodiment of the present invention.

FIG. 3 is a conceptual drawing showing the planetary gear unit according to the first embodiment of the present invention. FIG. 4 is a torque diagram during an ordinary running state according to the first embodiment of the present invention.

In this first embodiment, the ring gear RG of the planetary gear unit 13 (FIG. 2) has twice as many gear teeth as the sun gear S. Where a torque output to the output shaft 14, namely, an output torque is TOUT, a torque of the engine 11, namely, an engine torque is TE, and a torque of the generator motor 16, namely, a motor torque is TG;

TE:TOUT:TG=3:2:1

Reaction forces of the torques have effects between one another.

The one-way clutch F prevents the output shaft 12 from beginning to rotate the engine 11 in the backward direction. When the engine 11 is stopped and no engine torque TE is generated, the reaction force of the generator motor torque TG has an effect on a torque of the one-way clutch F, namely, a one-way clutch torque TF.

The driving force will now be described.

Figure 5:
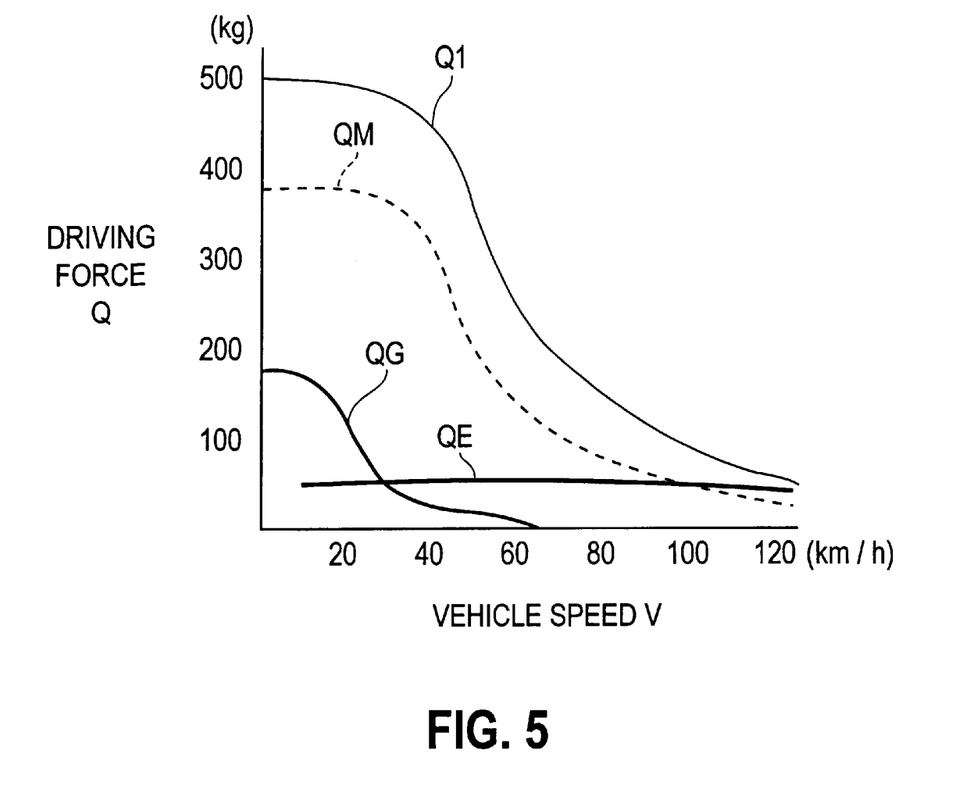
FIG. 5 is a chart showing a relation between the vehicle speed and the driving force according to the first embodiment of the present invention.

FIG. 5 is a chart showing a relation between a vehicle speed and a driving force in the first embodiment of the present invention. In the figure, the X-axis represents the vehicle speed V and the Y-axis represents the driving force Q.

Where a gear ratio between the planetary gear unit 13 (FIG. 2) and the driving wheel is r and a radius of the driving wheel is R, the driving force Q of the hybrid vehicle can be given by:

$$Q=TOUT \cdot r/R$$

Further, where the driving force required for running the hybrid vehicle at the vehicle speed V is Q1, the driving force of the drive motor 25 is QM, the driving force of the generator motor 16 is QG, and the driving force of the engine 11 is QE, the driving force QM is smaller than the required driving force Q1, is therefore not sufficient to run the hybrid vehicle.

It therefore becomes necessary to supplement the driving force obtained from driving the drive motor 25 with the driving force obtained from the engine 11 or the generator motor 16. In general, as the vehicle speed V is higher, the generator motor 16 driving force QG is greater. For example, if the vehicle speed V is less than 30 [km/h], the driving force QG is greater than the driving force QE of the engine 11.

In this embodiment, therefore, when the vehicle speed V is less than 30 [km/h], the engine 11 is stopped, while the generator motor 16 is driven to supplement the insufficiency for the driving force obtained from driving only the drive motor 25 with the driving force QG. When the vehicle speed V is 30 [km/h] or more, the engine 11 is driven to supplement the insufficiency for the driving force obtained from driving only the drive motor 25 with the driving force QE.

Accordingly, it is possible to lower the driving force QM of the drive motor 25 in a region of low vehicle speed V. A torque constant of the drive motor 25 can therefore be made smaller for that amount, which allows the drive motor 25 to be built compactly.

When the hybrid vehicle is run with the engine 11 being stopped, the efficiency of the drive motor 25 is lowered if a load applied thereto is small. The hybrid vehicle is therefore run with the driving force QG of the generator motor 16 in a region, in which the load applied to the drive motor 25 is small, for example, in a region where the vehicle speed V is less than 30 [km/h], and with the driving force QM of the drive motor 25 in a region, in which the load applied to the drive motor 25 is large.

Figure 1:
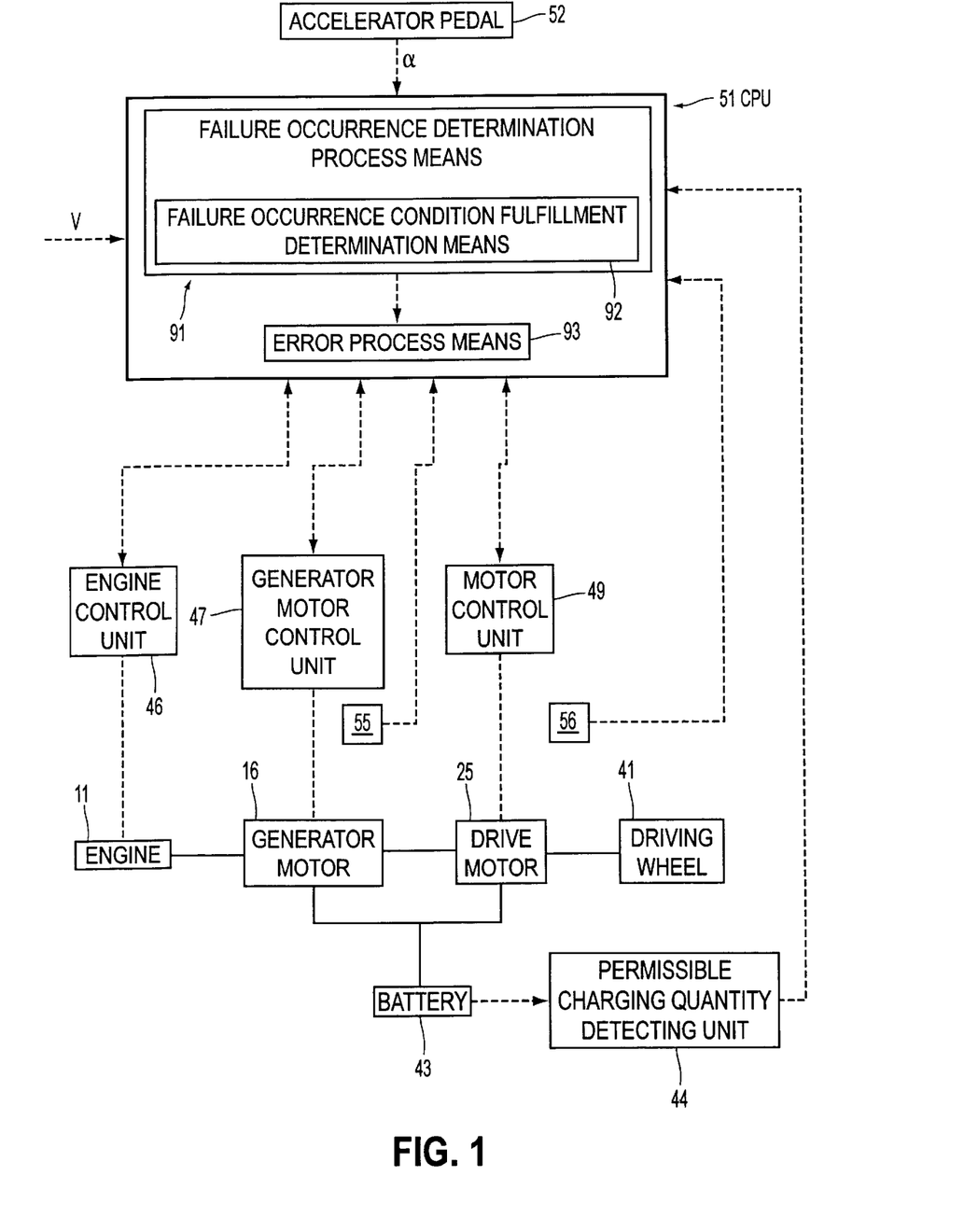
FIG. 1 is a block diagram showing a control of the hybrid vehicle according to the first embodiment of the present invention.

FIG. 1 is a block diagram showing a control of the hybrid vehicle according to the first embodiment of the present invention.

In the figure, a reference numeral 11 represents the engine, a reference numeral 16 represents the generator motor, and a reference numeral 25 represents the drive motor. Furthermore, a reference numeral 41 is the driving wheel, a reference numeral 43 is the battery, a reference numeral 44 is a permissible charging quantity detecting unit for the battery 43, and a reference numeral 52 is an accelerator pedal. The permissible charging quantity is detected based on a battery voltage, a state of charge of the battery, a battery temperature, and the like.

A reference numeral 46 represents an engine control unit that controls the engine 11 to be put into a driven state or a non-driven state, a reference numeral 47 represents a generator motor control unit that controls the generator motor 16, and a reference numeral 49 represents a motor control unit that controls the drive motor 25. The engine 11 can be put into the non-driven state by turning off an ignition switch (not shown) or by setting a throttle opening to zero (0).

A reference numeral 51 represents a CPU as a control unit for controlling the entire system of the hybrid vehicle. The CPU 51 controls the engine control unit 46, the generator motor control unit 47, and the motor control unit 49. A reference numeral 55 is a generator motor speed resolver as a generator motor speed detection means that detects the speed of the generator motor 16, namely, the generator motor speed NG, and a reference numeral 56 is a drive motor speed resolver as a drive motor speed detection means that detects the speed of the drive motor 25, namely, the drive motor speed NM.

The operation of the hybrid vehicle having the aforementioned configuration will now be described.

The CPU 51 reads a depressed amount of the accelerator pedal 52 (hereinafter referred to as the "accelerator opening") α detected by an accelerator sensor as a load detection means (not shown) and of the vehicle speed V detected by a vehicle speed detection means (not shown). Then an engine driving condition determination means (not shown) of the CPU 51 determines whether or not a first engine driving condition and a second engine driving condition are satisfied, and if the first and the second engine driving conditions are satisfied, it drives the engine 11 and, if the first and the second engine driving conditions are not satisfied, it stops the engine 11.

The first engine driving condition is whether or not the required driving force Q1 (FIG. 5) is small or not, namely, the accelerator opening α is 80 [%] or less. The first engine driving condition is satisfied when the accelerator opening α is 80 [%] or less and not satisfied when the accelerator opening α is more than 80 [%]. The second engine driving condition is whether or not the vehicle speed V is a set value, for example, 30 [km/h] or more. The second engine driving condition is satisfied when the vehicle speed V is 30 [km/h] or more and not satisfied when the vehicle speed V is less than 30 [km/h].

The required driving force Q1 to start the hybrid vehicle to move is extremely large and the accelerator opening α is more than 80[%], and the vehicle speed V is less than 30 [km/h]. The first and the second engine driving conditions are not therefore satisfied, so the engine 11 is remained stopped.

Then, a generator motor drive process means (not shown) of the CPU 51 performs a generator motor drive process to maximize a target torque of the drive motor 25, namely, the target motor torque TM* and also a target motor torque of the generator motor 16, namely, the target motor torque TG*, and transmits the target motor torque TM* to the motor control unit 49 and the target motor torque TG* to the generator motor control unit 47. The motor control unit 49 controls the drive motor 25 based on the target motor torque TM* and the generator motor control unit 47 controls the generator motor 16 based on the target motor torque TG*. In this case, the insufficiency for the driving force obtained from driving only the drive motor 25 is supplemented with the driving force QG of the generator motor 16.

Once the first and the second engine driving conditions are satisfied, an engine driving process means (not shown) of the CPU 51 transmits an engine driving signal to the engine control unit 46. On receipt of the engine driving signal, the engine control unit 46 controls the engine 11 and starts the engine 11.

In this case, the insufficiency for the driving force obtained from driving only the drive motor 25 is supplemented with the driving force QE of the engine 11.

As described above, in the hybrid vehicle of the foregoing configuration, in the region of the low vehicle speeds V, more specifically, each time the hybrid vehicle requiring an extremely large driving force Q1 to start to move, the insufficiency of the driving force obtained from driving only the drive motor 25 is supplemented with the driving force QG of the generator motor 16. As a result, the one-way clutch F is affected by a reaction force generated by the driving of the generator motor 16, and a repeated load is applied to the one-way clutch F (FIG. 2). So, the one-way clutch F could be damaged, leading to a problem of backward rotation or seizure. If it is incapable of determining whether or not a failure has occurred in the one-way clutch F, the damage of the one-way clutch F will be aggravated.

The CPU 51 is therefore used to determine whether or not a failure has occurred in the one-way clutch F.

Figure 6:
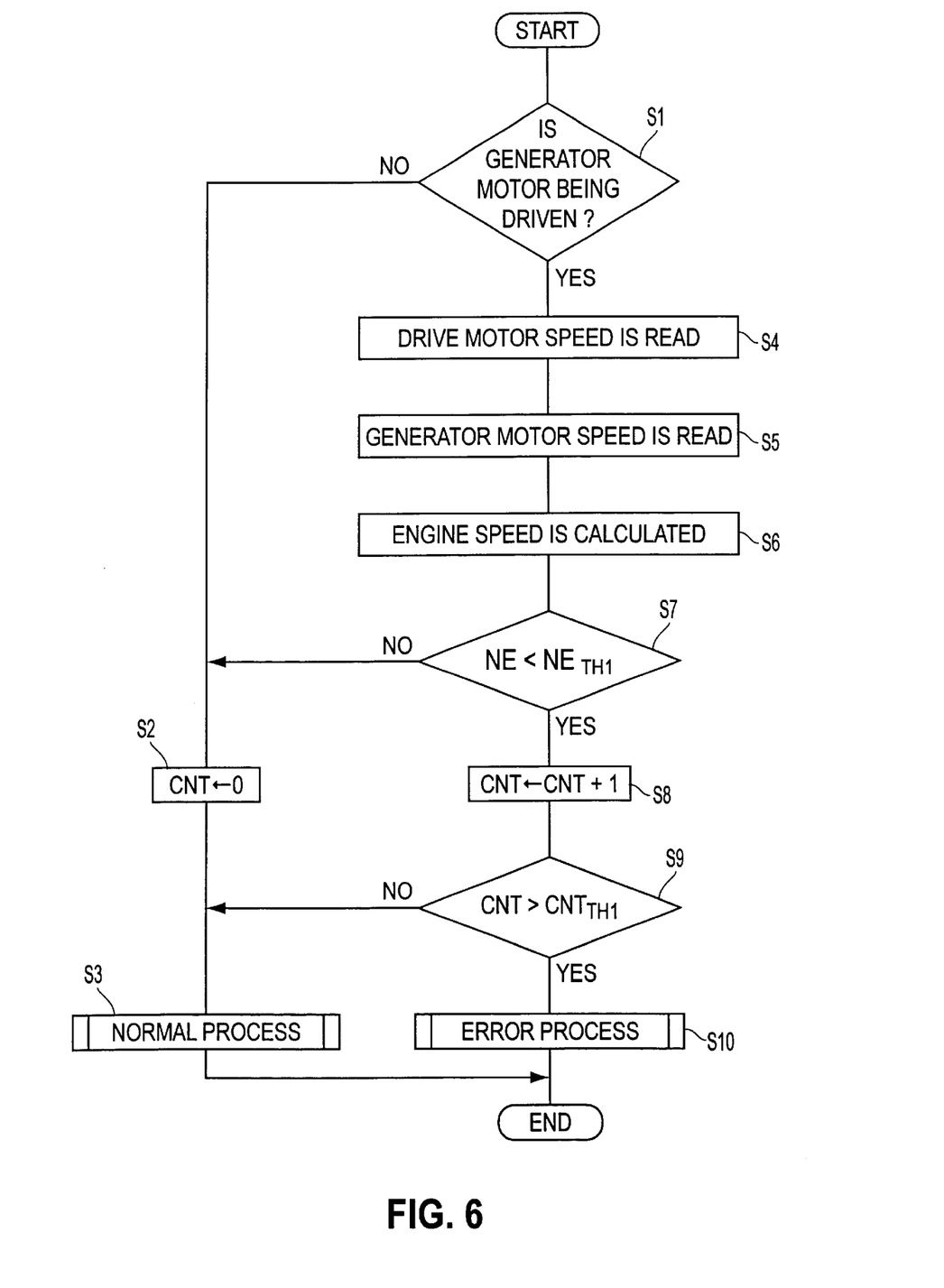
FIG. 6 is a flow chart showing the operation of the CPU according to the first embodiment of the present invention.

FIG. 6 is a flow chart showing the operation of the CPU according to the first embodiment of the present invention.

A failure occurrence determination process means 91 of the CPU 51 (FIG. 1) reads the target motor torque TG* to determine whether or not the generator motor 16 is being driven. Whether or not the generator motor 16 is being driven is determined according to whether or not the generator motor 16 generates the motor torque TG so as to lower the speed of the engine 11, namely, the engine speed NE, based on the target motor torque TG*.

Then, if the generator motor 16 is being driven, the CPU 51 reads not only the drive motor speed NM detected by the drive motor speed resolver 56, but also the generator motor speed NG detected by the generator motor speed resolver 55. An engine speed calculation process means (not shown) of the CPU 51 performs an arithmetic operation to calculate the engine speed, thus finding the engine speed NE based on the drive motor speed NM and the generator motor speed NG.

A failure occurrence condition fulfillment determination means 92 of the failure occurrence determination process means 91 determines whether or not the failure occurrence condition is satisfied. In this case, the failure occurrence condition is satisfied when the engine speed NE is a negative value and, at the same time, is less (or is a value less) than an engine speed threshold $NE_{TH1}$ (for example, −100 (rpm)). The condition is not satisfied when the engine speed NE is the engine speed threshold $NE_{TH1}$ or more.

If the engine speed NE continues to be the above mentioned value for a predetermined time, namely, a time when the failure occurrence condition is satisfied CNT is greater than a threshold value $CNT_{TH1}$ (for example, 100 [ms]), the one-way clutch F rotates backward and the failure occurrence determination process means 91 determines that a failure of backward rotation has occurred in the one-way clutch F. If the failure occurrence condition is not satisfied, or the time when the failure occurrence condition is satisfied CNT is the threshold value $CNT_{TH1}$ or less, the failure occurrence determination process means 91 determines that a failure of backward rotation has not occurred in the one-way clutch F.

Then, when the failure of backward rotation occurs in the one-way clutch F, an error process means 93 of the CPU 51 performs an error correction process of, for example, stopping the generator motor 16 from generating the motor torque TG so as to lower the engine speed NE or controlling the engine 11 so as to rotate the engine 11 in the forward direction. If the failure of backward rotation does not occur in the one-way clutch F, a normal process means (not shown) of the CPU 51 performs a normal process.

Accordingly, when the failure of backward rotation occurs in the one-way clutch F, the error correction process is performed to stop the generator motor 16 from generating the motor torque TG so as to lower the engine speed NE and control the engine 11 so as to rotate the engine 11 in the forward direction, thereby preventing the damage of the one-way clutch F from being aggravated.

When the time when the failure occurrence condition is satisfied CNT is the threshold value $CNT_{TH1}$ or less, it is determined that the failure of backward rotation has not occurred in the one-way clutch F. This can prevent a false determination due to a detection error or the like from being made.

In this embodiment, the failure occurrence condition is satisfied when the engine speed NE is a negative value and, at the same time, is less than the engine speed threshold $NE_{TH1}$. The failure occurrence condition may also be set so that it is satisfied when the engine speed NE is a negative value. Furthermore, in this embodiment, the failure occurrence condition fulfillment determination means 92 determines that the failure of backward rotation has occurred in the one-way clutch F when the time when the failure occurrence condition is satisfied CNT is greater than the threshold value $CNT_{TH1}$. It may also be adapted to determine that the failure of backward rotation has occurred in the one-way clutch F when the failure occurrence condition is satisfied.

The flow chart of FIG. 6 will now be described.

Step S1: It is determined whether or not the generator motor 16 is being driven or not. If the generator motor 16 is being driven, the routine proceeds to step S4 and, if the generator motor 16 is not being driven, the routine proceeds to step S2.

Step S2: "0" is set for the time when the failure occurrence condition is satisfied CNT.

Step S3: The normal process is performed to complete the routine.

Step S4: The drive motor speed NM is read.

Step S5: The generator motor speed NG is read.

Step S6: The engine speed NE is calculated.

Step S7: It is determined whether or not the engine speed NE is less than the engine speed threshold $NE_{TH1}$. If the engine speed NE is less than the engine speed threshold $NE_{TH1}$, the routine proceeds to step S8 and, if the engine speed NE is the engine speed threshold $NE_{TH1}$ or more, the routine proceeds to step S2.

Step S8: The time when the failure occurrence condition is satisfied CNT is incremented.

Step S9: It is determined whether or not the time when the failure occurrence condition is satisfied CNT is greater than the threshold value $CNT_{TH1}$. If the time when the failure occurrence condition is satisfied CNT is greater than the threshold value $CNT_{TH1}$, then the routine proceeds to step S10 and, if the time when the failure occurrence condition is satisfied CNT is the threshold value $CNT_{TH1}$ or less, then the routine proceeds to step S3.

Step S10: The error process is carried out, and the routine is completed.

A second embodiment of the present invention will now be described.

Figure 7:
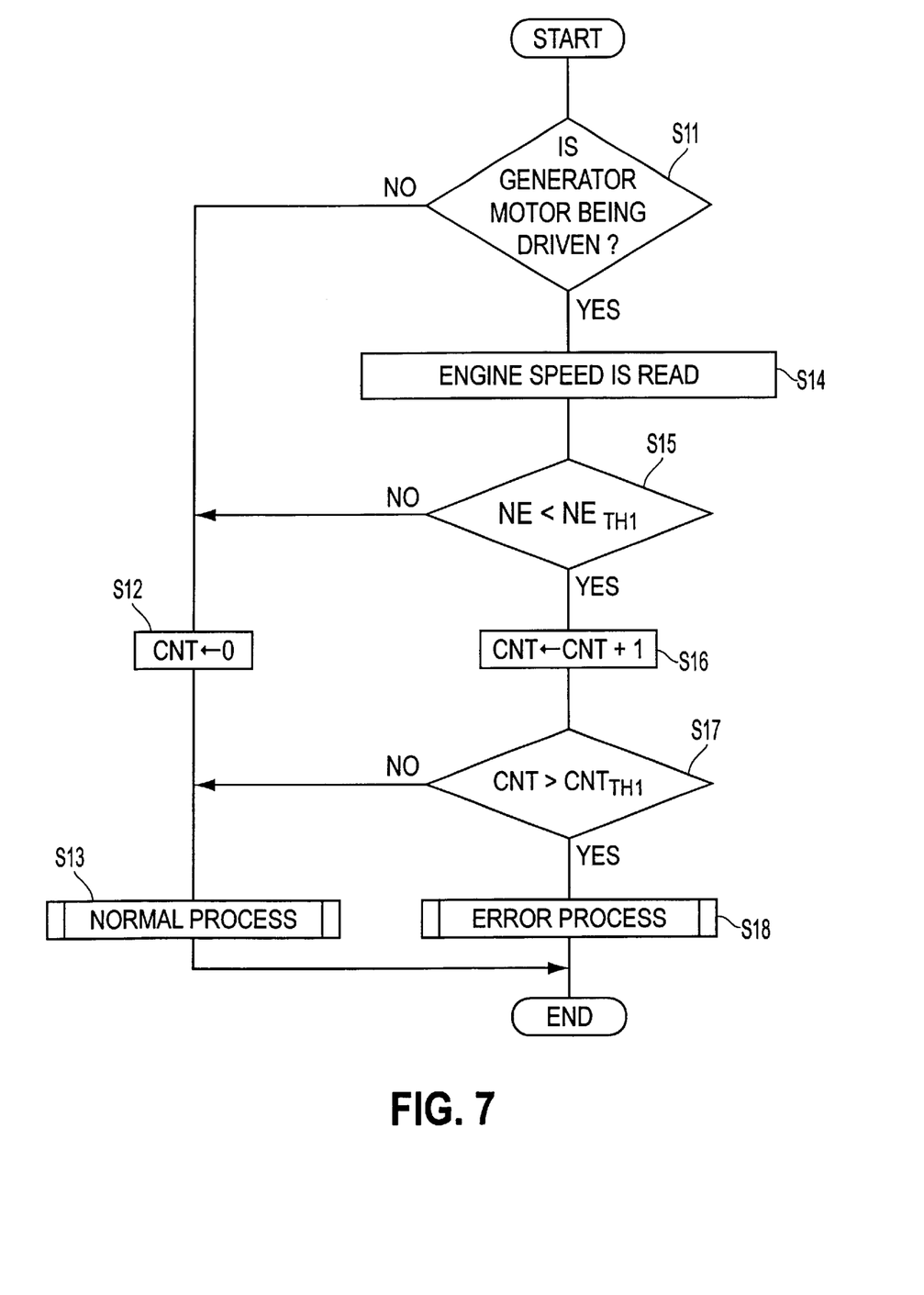
FIG. 7 is a flow chart showing the operation of the CPU according to the second embodiment of the present invention.

FIG. 7 is a flow chart showing the operation of the CPU according to the second embodiment of the present invention.

In this case, an engine speed sensor (not shown) is disposed as an engine speed detection means. The engine speed sensor which is capable of detecting the engine speed NE and, at the same time, determining whether the engine 11 (FIG. 1) rotates in the forward direction or a backward direction, namely, whether the engine speed NE is a positive value or a negative value is used. The engine speed sensor is not necessary, if the engine speed NE can be detected by the engine control unit 46.

The failure occurrence determination process means 91 of the CPU 51 first reads the target motor torque TG* to determine whether or not the generator motor 16 is being driven. If the generator motor 16 is being driven, the failure occurrence determination process means 91 reads the engine speed NE detected by the engine speed sensor. The failure occurrence condition fulfillment determination means 92 of the failure occurrence determination process means 91 then determines whether or not the failure occurrence condition is satisfied. In this case, the failure occurrence condition is satisfied when the engine speed NE is a negative value and, at the same time, is less (or is a value less) than the engine speed threshold NETH1 (for example, −100 [rpm]). The condition is not satisfied when the engine speed NE is the engine speed threshold $NE_{TH1}$ or more.

If the engine speed NE continues to be the above mentioned value for a predetermined time, namely, the time when the failure occurrence condition is satisfied CNT is greater than the threshold value $CNT_{TH1}$ (for example, 100 [ms]), the one-way clutch F rotates backward and the failure occurrence determination process means 91 determines that the failure of backward rotation has occurred in the one-way clutch F. If the failure occurrence condition is not satisfied, or the time when the failure occurrence condition is satisfied CNT is the threshold value $CNT_{TH1}$ or less, the failure occurrence determination process means 91 determines that the failure of backward rotation has not occurred in the one-way clutch F.

If the failure of backward rotation occurs in the one-way clutch F, the error process means 93 of the CPU 51 performs an error process of, for example, stopping the generator motor 16 from generating the motor torque TG so as to lower the engine speed NE or controlling the engine 11 so as to rotate the engine 11 in the forward direction. If the backward rotation failure does not occur in the one-way clutch F, the normal process means of the CPU 51 performs a normal process.

The flow chart of FIG. 7 will now be described.

Step S11: It is determined whether or not the generator motor 16 is being driven. If the generator motor 16 is being driven, the routine proceeds to step S14 and, if the generator motor 16 is not being driven, the routine proceeds to step S12.

Step S12: "0" is set for the time when the failure occurrence condition is satisfied CNT.

Step S13: The normal process is carried out, and the routine is completed.

Step S14: The engine speed NE is read.

Step S15: It is determined whether or not the engine speed NE is less than the engine speed threshold $NE_{TH1}$. If the engine speed NE is less than the engine speed threshold $NE_{TH1}$, the routine proceeds to step S16 and, if the engine speed NE is the engine speed threshold $NE_{TH1}$ or more, the routine proceeds to step S12.

Step S16: The time when the failure occurrence condition is satisfied CNT is incremented.

Step S17: It is determined whether or not the time when the failure occurrence condition is satisfied CNT is greater than the threshold value $CNT_{TH1}$. If the time when the failure occurrence condition is satisfied CNT is greater than the threshold value $CNT_{TH1}$, then the routine proceeds to step S18 and, if the time when the failure occurrence condition is satisfied CNT is the threshold value $CNT_{TH1}$ or less, then the routine proceeds to step S13.

Step S18: The error process is carried out, and the routine is completed.

A third embodiment of the present invention will now be described.

Figure 8:
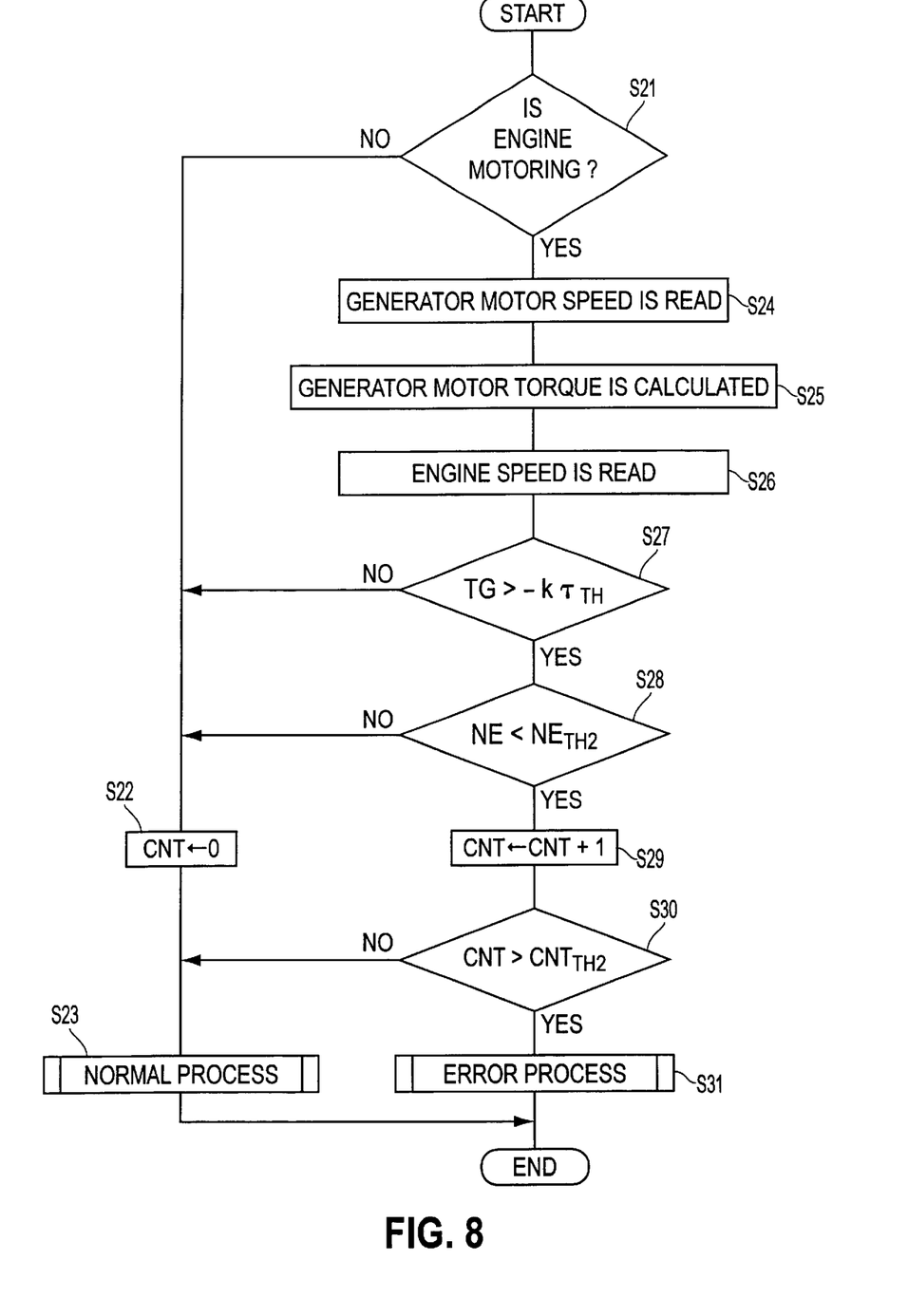
FIG. 8 is a flow chart showing the operation of the CPU according to the third embodiment of the present invention.

FIG. 8 is a flow chart showing the operation of the CPU according to the third embodiment of the present invention.

The failure occurrence determination process means 91 of the CPU 51 (FIG. 1) first determines whether or not the engine 11 is starting, namely, whether or not it is motoring. To start the engine 11, it is necessary to drive the generator motor 16 for generating the motor torque TG in the direction so as to increase the engine speed NE. Whether or not the engine 11 is motoring is therefore determined according to whether or not the target generator motor speed NG* is generated so as to generate the motor torque TG in the direction to increase the engine speed NE (for example, 1000 [rpm]).

If the engine 11 is motoring, the failure occurrence determination process means 91 reads the generator motor speed NG detected by the generator motor speed resolver 55 and a motor torque calculation process means (not shown) of the CPU 51 calculates the motor torque TG based on the generator motor speed NG. The failure occurrence determination process means 91 also reads the engine speed NE detected by the engine speed sensor (not shown) as an engine speed detection means. It is not necessary, in this case, to use the engine speed sensor that is capable of determining whether the engine speed NE is a positive value or a negative value.

The failure occurrence condition fulfillment determination means 92 of the failure occurrence determination process means 91 then determines whether or not the failure occurrence condition is satisfied. In this case, the failure occurrence condition comprises a first condition and a second condition. The first condition is satisfied when the calculated motor torque TG is sufficient to rotate the stopped engine 11, namely, the motor torque TG is greater than a motor torque threshold value $-k_{\tau_{TH}}$, where an engine starting torque required to rotate the stopped engine 11 is τ and the gear ratio between the engine 11 and the generator motor 16 in the planetary gear unit 13 (FIG. 2) is k, and is not satisfied when the motor torque TG is the motor torque threshold value $-k_{\tau_{TH}}$ or less. The second condition is satisfied when the engine speed NE is less than an engine speed threshold value $NE_{TH2}$ (for example, 100 [rpm]) and is not satisfied when the engine speed NE is the engine speed threshold value $NE_{TH2}$ or more.

The failure occurrence determination process means 91 determines that the one-way clutch F seizes and a failure of seizure has occurred in the one-way clutch F if the motor torque TG continues to be a value greater than the motor torque threshold value $-k_{\tau_{TH}}$ for a predetermined time and, at the same time, the engine speed NE is less (or is a value less) than the engine speed threshold value $NE_{TH2}$ for a predetermined time, namely, the time when the failure occurrence condition is satisfied CNT is greater than a threshold value $CNT_{TH2}$ (for example, 500 [ms]), and determines that the failure of seizure has not occurred in the one-way clutch F if the time when the failure occurrence condition is satisfied CNT is the threshold value $CNT_{TH2}$ or less.

Then, if the failure of seizure has occurred in the one-way clutch F, the error process means 93 of the CPU 51 performs an error process of stopping the engine 11 to start the engine 11 so that the generator motor 16 will not be kept driven even though the engine 11 cannot be started, and limiting the motor torque TM generated by the drive motor 25.

Stopping the engine 11 to start the engine or limiting the motor torque TM generated by the drive motor 25 allows the hybrid vehicle to move to a safe location or to a nearest service shop by operating the drive motor 25 only.

Accordingly, if the failure of seizure has occurred in the one-way clutch F, it is possible to prevent the battery from running down by stopping the engine 11 to start or limiting the motor torque TM.

If the time when the failure occurrence condition is satisfied CNT is the threshold value $CNT_{TH2}$ or less, it is determined that the failure of seizure has not occurred in the one-way clutch F and the normal process means (not shown) of the CPU 51 performs a normal process. This can prevent a false determination due to a detection error or the like from being made.

In the present embodiment, the failure occurrence condition fulfillment determination means 92 determines that the failure of seizure has occurred in the one-way clutch F if the time when the failure occurrence condition is satisfied CNT is greater than the threshold value $CNT_{TH2}$. It may also be adapted to determine that the failure of seizure has occurred in the one-way clutch F when the failure occurrence condition is satisfied.

The flow chart of FIG. 8 will now be described.

Step S21: It is determined whether or not the engine 11 is motoring. If the engine is motoring, the routine proceeds to step S24 and, if the engine is not motoring, the routine proceeds to step S22.

Step S22: "0" is set for the time when the failure occurrence condition is satisfied CNT.

Step S23: The normal process is carried out, and the routine is completed.

Step S24: The generator motor speed NG is read.

Step S25: The motor torque TG is calculated.

Step S26: The engine speed NE is read.

Step S27: It is determined whether or not the motor torque TG is greater than the motor torque threshold value $-k_{\tau_{TH}}$. If the motor torque TG is greater than the motor torque threshold value $-k_{\tau_{TH}}$, the routine proceeds to step S28. If the motor torque TG is the motor torque threshold value $-k_{\tau_{TH}}$ or less, the routine proceeds to step S22.

Step S28: It is determined whether or not the engine speed NE is less than the engine speed threshold $NE_{TH2}$. If the engine speed NE is less than the engine speed threshold $NE_{TH2}$, the routine proceeds to step S29 and, if the engine speed NE is the engine speed threshold $NE_{TH2}$ or more, the routine proceeds to step S22.

Step S29: The time when the failure occurrence condition is satisfied CNT is incremented.

Step S30: It is determined whether or not the time when the failure occurrence condition is satisfied CNT is greater than the threshold value $CNT_{TH2}$. If the time when the failure occurrence condition is satisfied CNT is greater than the threshold value $CNT_{TH2}$, then the routine proceeds to step S31 and, if the time when the failure occurrence condition is satisfied CNT is the threshold value $CNT_{TH2}$ or less, then the routine proceeds to step S23.

Step S31: The error process is carried out, and the routine is completed.

A fourth embodiment of the present invention will now be described. Description of the same configuration as in the first embodiment will be omitted by indicating the same reference numerals.

Figure 9:
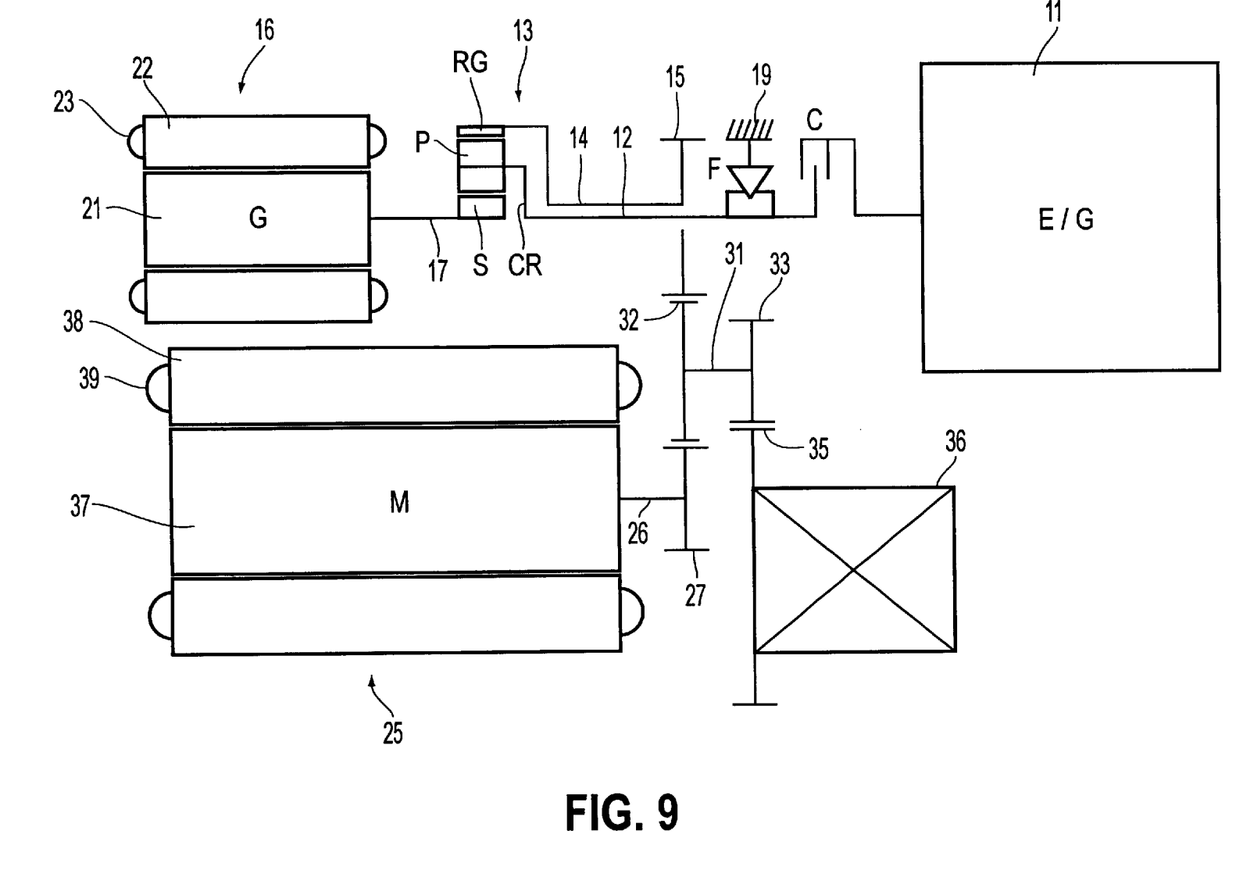
FIG. 9 is a conceptual drawing showing the driving unit for the hybrid vehicle according to the fourth embodiment of the present invention.

FIG. 9 is a conceptual drawing representing a driving unit for a hybrid vehicle according to the fourth embodiment of the present invention.

In this case, a clutch C is disposed between the engine (E/G) 11 and the output shaft 12, and the one-way clutch F is disposed between the output shaft 12 and the casing 19. To engage and disengage the clutch C, a clutch control unit (not shown) is connected to the CPU 51 (FIG. 1).

It is therefore possible to release the clutch C while supplementing a insufficiency for the driving force obtained from driving only the drive motor (M) 25 with the driving force QC of the generator motor (G) 16 as an electric unit. As a result, the engine 11 can be kept driven for that time.

A fifth embodiment of the present invention will now be described. Description of the same configuration as in the first embodiment will be omitted by indicating the same reference numerals.

Figure 10:
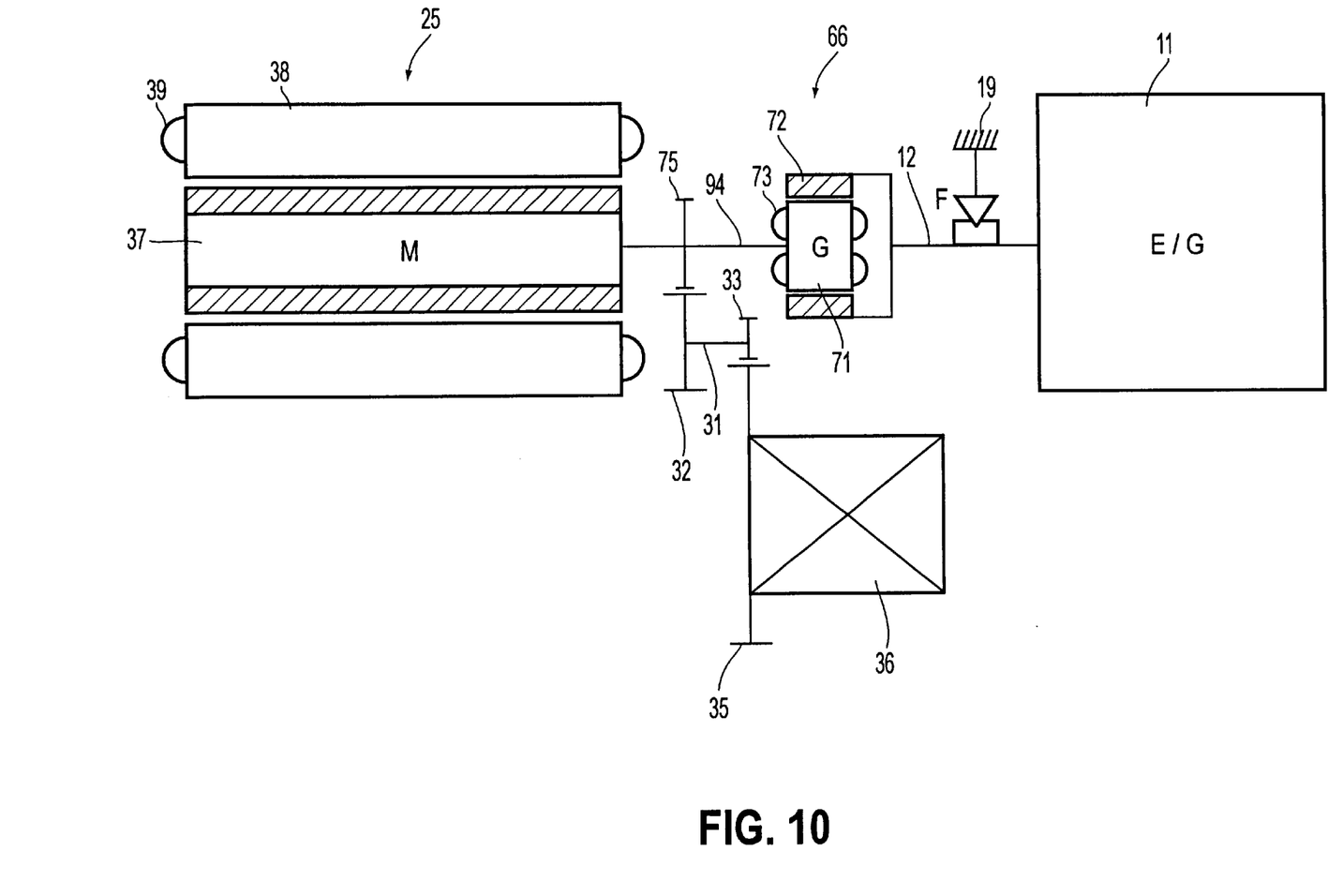
FIG. 10 is a conceptual drawing showing the driving unit for the hybrid vehicle according to the fifth embodiment of the present invention.

FIG. 10 is a conceptual drawing representing a driving unit for a hybrid vehicle according to the fifth embodiment of the present invention.

In the figure, the reference numeral 11 is the engine (E/G) and the reference numeral 12 is the output shaft, to which a generator motor 66 as an electric unit is coupled. The one-way clutch F is disposed between the output shaft 12 and the casing 19.

The generator motor 66 comprises a rotor 71 disposed rotatably, the stator 72 disposed rotatably around the rotor 71, and the coil 73 installed by winding around the rotor 71. The generator motor 66 generates an electric power by the rotation transmitted through the output shaft 12. The coil 73 is connected to the battery 43 (FIG. 1) and supplies the battery 43 with a current for charging.

The reference numeral 25 represents the drive motor (M), a reference numeral 94 represents an output shaft, to which the rotation of the drive motor 25 is output and which is coupled to the driving wheel, and a reference numeral 75 represents a counter drive gear secured to the output shaft 94. The drive motor 25 comprises a rotor secured to the output shaft 94 and disposed rotatably, a stator 38 disposed around the rotor 37, and a coil 39 installed by winding around the stator 38.

The drive motor 25 generates the torque by the current supplied to the coil 39. To accomplish that, the coil 39 is connected to the battery 43, the current being supplied therefrom. When the hybrid vehicle is in a decelerating state, the drive motor 25 receives the rotation from the driving wheel 41 to generate a regenerative current and supplies the regenerative current to the battery 43 for charging.

In this case, it is possible to stop the engine 11, and supplement the deficiency for the driving force obtained by only driving the drive motor 25 with the driving force QG of the generator motor 66.

In the first to fourth embodiments, the planetary gear unit 13 comprising a planetary gear train is used as the differential gear unit. As the planetary gear unit, a planetary gear unit that comprises a first planetary gear train and a second planetary gear train may also be used. In this case, the first planetary gear train comprises a first sun gear, a first pinion that is in mesh with the first sun gear, a first ring gear that is in mesh with the first pinion, and a first carrier that supports the first pinion rotatably. The second planetary gear train comprises a second sun gear, a second pinion that is in mesh with the second sun gear, a second ring gear that is in mesh with the second pinion, and a second carrier that supports the second pinion roratably. In the planetary gear unit, the first carrier and the second sun gear are coupled and the first ring gear and the second carrier are coupled. Moreover, the second sun gear and the first carrier, each constituting a first gear element, are coupled to the engine, the second ring gear constituting a second gear element is coupled to the generator motor, the first sun constituting a third gear element is coupled to the drive motor, and the second carrier and the first ring gear, each constituting a fourth gear element, is coupled to the output shaft.

It should be understood that the present invention is not limited to the embodiment, but may be otherwise variously embodied within the spirit and scope of this invention.

What is claimed is:

1. A hybrid vehicle, comprising:
an engine, a generator motor, an output shaft coupled to a driving wheel, and a differential gear unit that is provided with at least three gear elements, the elements coupled to the engine, the generator motor, and the output shaft, respectively, a one-way clutch that is placed in a free state when the engine rotates in a forward direction and in a locked state when the engine begins to rotate in a backward direction, and a failure occurrence determination process means that determines that a failure has occurred in the one-way clutch if an engine speed is a negative value.

2. A hybrid vehicle according to claim 1, further comprising:
an error process means that, when it is determined that a failure has occurred in the one-way clutch, stops the generator motor from generating a motor torque in the engine backward rotation direction.

3. A hybrid vehicle according to claim 1, wherein:
the failure occurrence determination process means determines that a failure has occurred in the one-way clutch if the engine speed continues to be the above mentioned value for a predetermined time.

4. A hybrid vehicle, comprising:
an engine,
a generator motor,
an output shaft coupled to a driving wheel,
a differential gear unit that is provided with at least three gear elements, the elements coupled to the engine, the generator motor, and the output shaft,
a one-way clutch that is placed in a free state when the engine rotates in a forward direction and in a locked state when the engine begins to rotate in a backward direction, and
a failure occurrence determination process means that determines that a failure has occurred in the one-way clutch if an engine speed is a negative value when a motor torque in the engine backward rotation direction is generated by the generator motor.

5. A hybrid vehicle according to claim 4, further comprising:
an error process means that, when it is determined that a failure has occurred in the one-way clutch, stops the generator motor from generating a motor torque in the engine backward rotation direction.

6. A hybrid vehicle according to claim 4, wherein:
the failure occurrence determination process means determines that a failure has occurred in the one-way clutch if the engine speed continues to be the above mentioned value for a predetermined time.

7. A hybrid vehicle, comprising:
an engine, a generator motor, an output shaft coupled to a driving wheel, a differential gear unit that is provided with at least three gear elements, the elements coupled to the engine, the generator motor, and the output shaft, respectively, a one-way clutch that is placed in a free state when the engine rotates in a forward direction and in a locked state when the engine begins to rotate in a backward direction, and a failure occurrence determination process means that determines that a failure has occurred in the one-way clutch if a motor torque generated by the generator motor is greater than a motor torque threshold value and, at the same time, an engine speed is a value less than an engine speed threshold value, when a motor torque in a direction of increasing the engine speed is generated by the generator motor.

8. A hybrid vehicle according to claim 7, further comprising:
an error process means that, when it is determined that a failure has occurred in the one-way clutch, stops the engine from being started.

9. A hybrid vehicle according to claim 7, further comprising:
a drive motor that is driven by an electric power obtained from the generator motor and an error process means that, when it is determined that a failure has occurred in the one-way clutch, limits a motor torque generated by the drive motor.

10. A hybrid vehicle according to claim 7, wherein:
the failure occurrence determination process means determines that a failure has occurred in the one-way clutch if the engine speed continues to be the above mentioned value for a predetermined time.

* * * * *

UNITED STATES PATENT AND TRADEMARK OFFICE
CERTIFICATE OF CORRECTION

PATENT NO.    : 6,722,456 B2
DATED         : April 20, 2004
INVENTOR(S)   : Hisada It is certified that error appears in the above-identified patent and that said Letters Patent is hereby corrected as shown below:

<u>Title page,</u>
Item [*] Notice, delete the phrase "by 194" and insert -- by 113 days --

Signed and Sealed this

Tenth Day of May, 2005

JON W. DUDAS
*Director of the United States Patent and Trademark Office*